United States Patent Office 2,777,777
Patented Jan. 15, 1957

2,777,777
PROCESS FOR PREPARING CADMIUM RED PIGMENT

Benjamin W. Allan and Frank O. Rummery, Baltimore, Md., assignors to The Glidden Company, Cleveland, Ohio, a corporation of Ohio No Drawing. Application May 21, 1953, Serial No. 356,596

20 Claims. (Cl. 106—301)

This invention relates to a novel process for preparing pure or extended cadmium red pigment through the use of selenium dioxide, selenium trioxide, or mixtures thereof as the source of at least a part of the selenium which is needed to combine with cadmium sulfide to prepare a calcined cadmium red pigment of desired shade.

Pure cadmium red pigments are composed of cadmium, sulfur and selenium in chemical and/or physico-chemical combination in proportions which may be varied over rather wide ranges to yield different shades of color from orange to maroon. Pure cadmium yellow pigments are composed only of cadmium and sulfur, but when very small amounts of selenium are introduced thereinto in appropriate manner, the color deepens to orange. As increasing quantities of selenium are introduced, the color deepens further to red, to maroon and ultimately to deep maroons. The extended cadmium red pigments are analogous to the pure reds in the foregoing respects, the difference being that the extended reds include barium sulfate as an extender. In the past, the selenium content of pure or extended cadmium red pigments has been introduced in the form of elemental selenium, either as very finely ground selenium intimately mixed with precipitated cadmium sulfide, or as elemental selenium coprecipitated with cadmium sulfide from an aqueous solution of an alkali-metal sulfide or alkali-earth metal sulfide. We have found, however, that it is unnecessary to use only elemental selenium, and that oxidic water-soluble compounds of selenium can be employed instead to provide a part or all of the needed selenium. The co-pending application of Allan and Rummery, Serial No. 299,920, filed July 19, 1952 discloses and claims processes wherein various selenium compounds are admixed with precipitated cadmium sulfide in advance of calcination. The present disclosure relates to processes wherein a soluble oxidic selenium compound, such as selenium dioxide and/or selenium trioxide is dissolved in the cadmium sulfate reactant solution, or the alkali-metal sulfide solution, or both, used in preparing pure or extended precipitated cadmium sulfo-selenide raw pigment.

Accordingly, it is the primary object of this invention to prepare pure or extended cadmium red pigment by introducing one or more water-soluble oxidic selenium compounds into the cadmium salt strike solution used in forming crude precipitated cadmium red pigment.

It is a further object to use one or more oxidic selenium compounds to supply at least part of the selenium which is to be coprecipitated with cadmium sulfide when preparing raw cadmium red pigment.

In making the "pure" pigment, the $SeO_2$—$SeO_3$ type compound can be added to the alkali metal sulfide reactant solution, also, with satisfactory results. However, this is not feasible when barium sulfide solution is used as the sulfidic reactant in making $BaSO_4$ composite-type pigments. Accordingly, it is another object to prepare crude cadmium red pigment of the "pure" type by dissolving oxidic selenium compound in the alkali metal sulfide reactant solution.

Further and ancillary objects will be apparent from the following description of the invention.

We have now discovered that a water-soluble oxidic selenium compound such as selenium dioxide and/or selenium trioxide, or aqueous solutions thereof can be dissolved in the cadmium salt strike solution used in preparing crude precipitated cadmium sulfoselenide pigment, with the result that the selenium content of said compound can be coprecipitated in insoluble form along with the crude cadmium sulfide pigment. After the aqueous solutions have been suitably reacted, the selenium content is found to be uniformly distributed through the crude pigment. The crude pigment can thereafter be washed to free it of soluble compounds without losing selenium, and the washed, crude pigment can then be suitably calcined in known manners to convert it to cadmium red pigment of excellent quality.

From the foregoing brief description of the invention it will be apparent that our new process represents a significant advance in the art since for the first time, soluble oxidic compounds such as selenium dioxide can be used in a strike to supply part or all of the selenium needed in cadmium red pigments, thereby avoiding the higher costs involved in prior processes which have necessitated the use of elemental selenium.

The foremost problem encountered in working out the present invention was that of converting the soluble oxidic selenium compound during the pigment strike to well dispersed and uniformly distributed water-insoluble products. In the course of our investigations we found that under some strike conditions the selenium compound was not completely converted to water-insoluble products, and that under other conditions some of the water-soluble cadmium salts of a strike liquor were not completely precipitated although the selenium content was insoluble. We ultimately discovered how to prevent both of these undesired results, thereby to obtain a crude precipitate which could be thoroughly washed without losing either cadmium content or selenium content.

*Example 1*

Fourteen grams of selenium dioxide was dissolved in 116 ml. of a cadmium sulfate solution containing 180 grams/liter of cadmium. Twenty-nine milliliters of the same cadmium sulfate solution, but which had not been treated with $SeO_2$, were set aside for subsequent use as described hereinbelow.

A sodium sulfide solution containing 37.2 g./l of sulfide ion was provided. The solution had an OH/SH ratio of 1.06:1.00. Two hundred milliliters of the solution were used.

In the total reaction, i. e., after addition of the last 20% of the cadmium sulfate solution (29 ml.), it was desired to form 33.5 grams of CdS. This required 200 cc. of the above $Na_2S$ solution, which precipitated all of the soluble cadmium in the first step and raised the pH+ of the slurry to 9.2. A large amount of selenium was present at this point in a soluble form. The remaining $CdSO_4$ solution was added and the pH+ dropped to 7.7. The filtrate was tested and found to contain no soluble Se. Adjustments were made, subsequently, with small quantities of NaOH solution and $CdSO_4$ solution, until all of the strike components were entirely precipitated.

The precipitate was filtered and washed to remove sulfates. Neither cadmium nor selenium was washed out of the cake.

The washed precipitate was calcined in a closed tube furnace, the temperature being raised quickly to 575° C., and then being held for 50 minutes. The calcined mass was quenched in distilled water which had been boiled to remove any dissolved oxygen. The resulting mass was much darker in color than the standard maroon and was very clean and bright.

Example 2

In order to produce a color which could be evaluated by means of the "Cadmolith" standards, the proportion of $SeO_2$ was reduced by half as compared with Example 1.

Seven grams of the same $SeO_2$ was added to 130.5 ml. of the cadmium sulfate solution used in Example 1 and the resulting mixture was treated with 200 ml. of sodium sulfide solution, the same as had been used in Example 1. The pH+ was then 8.5, and in order to prevent the loss of selenium values 14.5 ml. $CdSO_4$ was added, reducing the pH+ to 7.6. At this point the selenium was entirely precipitated, but a slight amount of soluble cadmium was present. Upon the addition of a small amount of solution containing 1.0 g. NaOH, the soluble cadmium was precipitated, and the selenium remained precipitated, also.

Upon washing to remove soluble salts no selenium nor cadmium values were lost.

The washed pigment was calcined as in Example 1, but for only 39 minutes at 575° C., and then was quenched similarly. The resulting pigment had a color of 85% light red, 15% medium light red and was clean and bright, with a tinting strength over 300% as compared with the cadmium lithopone standards.

Example 3

In this test the proportion of $SeO_2$ was increased 50% over that of Example 2. The same solutions were used as in Examples 1 and 2. 22.82 grams of $SeO_2$ was dissolved in 296.4 ml. of cadmium sulfate solution. The theoretical amount of sodium sulfide solution (430 ml.) was added to the mixed selenium-cadmium solution and a pH+ of 8.9 was recorded. 15.6 ml. $CdSO_4$ was added and the pH+ dropped to 8.1. At this point there was no appreciable amount of soluble selenium or cadmium.

The washed pigment was calcined in a closed tube furnace at 600° C. for 37 minutes and then was quenched as in Example 1. The pigment had a good tinting strength and was clean and bright, with a color of 85% medium red, 15% deep red.

Example 4

The proportion of $SeO_2$ was increased 10% over that of Example 3.

A new sodium sulfide solution was prepared with an OH:SH ratio of 0.936:1.00 and a sulfide ion concentration of 31.2 g./l.

The mixed solution of 25.0 grams $SeO_2$ dissolved in 280.8 ml. of cadmium sulfate solution had a pH+ of 1.1. After the sodium sulfide solution had been added, the pH+ of the slurry was 8.2. Additional cadmium sulfate solution was added, lowering the pH+ to approximately 7.0, and the filtrate was free of soluble selenium and cadmium.

The precipitate was filtered and washed, then treated with ammonium phosphate equivalent to 1% $H_3PO_4$, dried and calcined. Calcination was done in a closed tube furnace at 625° C. for 30 minutes, after which the calcined mass was quenched. The resulting pigment had a good tinting strength, was very clean and bright, and had a color corresponding to Deep Red.

Example 5

476 ml. of a barium sulfide solution, at 80° C., which contained 33.6 g./l. sulfide ion and a ratio $$OH:SH = 1.019:1.00,$$

was used as the alkaline-earth sulfide reactant.

Cadmium sulfate solution, at room temperature, was adjusted to 180 g./l. Cd concentration. 312 ml. of the solution was treated with 31.5 g. of $SeO_2$ containing 71.22% Se, which resulted in a reactant solution with a pH+ of 1.2.

The two reactant solutions were added simultaneously to the reaction vessel with thorough agitation which insured a complete dispersion of the selenium in the resulting precipitate. The final pH+ was 7.55. The slurry was diluted with an equal volume of water, filtered and washed. The filter-cake was slurried in a minimum of water and treated with a small amount of diammonium phosphate conditioning salt and dried at 110° C. The dry cake was crushed and calcined under conditions excluding extraneous gases, then quenched in water, filtered and dried.

The product was approximately equal to the cadmium lithopone "Deep" standard.

Example 6

430 gallons cadmium sulfate solution containing 180 g./l. Cd, was placed in the strike tank. The pH+ of the solution was 5.5. 329 pounds of pure $SeO_2$ was dissolved in the $CdSO_4$ solution.

The cadmium sulfate solution was agitated rapidly, and barium sulfide solution containing some dissolved elementary sulfur was added at a steady rate such that the addition was completed in 1½ hours. The time of addition is not entirely critical, but depends on the rate of agitation, an understanding of which will be clear to anyone skilled in the art.

The final pH+ was 8.3. Upon final adjustment with a small quantity of $CdSO_4$ solution the slurry was agitated for an additional 60 minutes to achieve final equilibrium, then filtered, and washed to remove traces of soluble salts.

The washed precipitate was dried and crushed to ½"–1" size preparatory to calcining. During the calcination air was excluded, but provision was made for the escape of gaseous reaction products through a vent stack. The calcination temperature rose to 630° C. in a period of 35 minutes. The batch was then discharged directly into clean water after which it was ground and treated similarly to any other cadmium red pigment.

Example 7

Another 312 ml. portion of the same original $CdSO_4$ solution used in Example 5 was treated with selenic acid containing 17.15 g. $SeO_3$. There resulted a clear water-white solution which was then reacted with another 476 ml. portion of the original barium sulfide solution, the same as was used in Example 5. Complete uniformity and homogeneity of the precipitate was insured by applying adequate agitation in the mixing of the two reactant solutions.

The volume of the resulting raw pigment slurry was doubled by dilution with water. The slurry was treated with 1% $K_2CO_3$ on a pigment weight basis, then filtered, dried, crushed, calcined, and quenched similarly to the procedure followed in Example 5.

The product was a light red cadmium lithopone pigment equal in quality to the "Cadmolith" standard.

Example 8

Cadmium sulfate solution was used at a concentration of 185 g./l. Cd and at pH+ 5.5. To 430 gallons was added 193 lbs. of $SeO_2$ with agitation to effect the dissolution of the $SeO_2$.

A BaS solution was employed at 60° C. with a Baumé density of 14.5° and a ratio OH:SH=1.09:1.00. A 667 gallon portion of this solution was treated with 224 lbs. of pure Se and agitated until all of the selenium was dissolved in the BaS solution.

The mixed solution of [BaS+Se] was added to the mixed solution of [$CdSO_4$+$SeO_2$], gradually, with rapid agitation, over a period of 1½ hours. Finally, a small portion of BaS solution was added raising the pH+ to 8.9. Agitation was continued for 10 minutes longer, then the slurry was diluted twofold with water, filtered, dried, crushed, and calcined in a rotary furnace. The temperature was raised to 670° C. in 32 minutes; the resulting pigment product was quenched in water, filtered and dried.

The final pigment was approximately medium red, of excellent color and a high tinting strength.

*Example 9*

A cadmium sulfate solution was prepared at 180 g./l. Cd concentration and at 5.5 ph+.

A solution of sodium sulfide was prepared containing 37.2 g./l. sulfide ion. The ratio OH:SH was 1.06:1.00. A 200 cc. portion of this $Na_2S$ solution was treated with 7 grams $SeO_2$, and mixed to obtain a uniform solution of the selenium in the sodium sulfide.

The cadmium sulfate (145 cc.) and the mixed $$SeO_2 + Na_2S$$

solution were brought together in a process of gradual addition and rapid agitation so that the final precipitate was entirely homogeneous.

The raw pigment was filtered and washed to remove soluble salts, then dried, crushed, and calcined. The pigment product was discharged directly from the furnace into pure water, filtered and dried.

A light red "pure" cadmium pigment resulted which was of very good quality in respect to tinting strength and color.

Example 9 shows that an alternative procedure is also satisfactory. That procedure involves dissolving the selenium dioxide in the soluble sulfide solution, and then striking the mixed sulfide—$SeO_2$ solution with cadmium sulfate. Subsequent reaction of the mixed solution with soluble cadmium salt solutions effectively insolubilizes most of the selenium while also precipitating the cadmium.

It will be understood that good agitation should be maintained throughout the strikes, whatever procedure or type of strike is being used, and that soluble cadmium salts other than cadmium sulfate (e. g., cadmium nitrate) can be used equally well except where $BaSO_4$-extended pigments are sought as the direct product of a strike.

It should be apparent without extended discussion that the usual ranges of temperature employed in prior art calcinations of cadmium pigments can be employed here to advantage. We have found, in general, however, that the optimum temperatures conducive to maximum tinting strengths and to maximum utilization of selenium are of narrower ranges than in prior art practices. In other words, where intervals of 50° C. might be tried in investigating calcining ranges of prior art practices, one should here employ intervals of only 25° C. or even less when seeking the optimum range.

Promoters and/or conditioners such as have been used in the past are equally useful here in improving the effects of calcination. The ammonium phosphate of Examples 4 and 5 and the potassium carbonate of Example 7 illustrate the use of such promoters and/or conditioners.

Calcination should, as will be understood, be carried out in an essentially inert or mildly reducing atmosphere as in prior art practice, and the hot pigment should preferably be quenched in water to minimize its oxidation and deterioration of color.

Having described our invention, what we claim is:

1. A process for preparing cadmium red pigment by precipitation and subsequent calcination which comprises the step of precipitating cadmium sulfide from aqueous ionic solutions of its component elements and simultaneously therewith coprecipitating selenium in a water-insoluble form from an aqueous solution which contains dissolved water-soluble selenium acid radicals selected from the group consisting of selenious acid radicals, selenic acid radicals and mixtures thereof as a result of dissolving in said aqueous solution oxidic selenium compound selected from the group consisting of selenium dioxide, selenium trioxide, and mixtures thereof.

2. A process as claimed in claim 1 wherein all of the selenium needed to combine with said precipitated cadmium sulfide to prepare a calcined cadmium red pigment of desired shade is provided by said aqueous solution of dissolved water-soluble selenium acid radicals and is simultaneously coprecipitated therefrom with said cadmium sulfide in accordance with claim 1.

3. A process as claimed in claim 1 wherein said cadmium sulfide is precipitated by reacting an aqueous solution of cadmium salt with an aqueous solution of alkali metal sulfide, and wherein said aqueous solution containing dissolved selenium acid radicals is provided by dissolving said oxidic selenium compound in said aqueous solution of cadmium salt.

4. A process as claimed in claim 3 wherein said dissolved oxidic selenium compound provides all of the selenium needed to combine with said precipitated cadmium sulfide to form a calcined cadmium red pigment of desired shade.

5. A process as claimed in claim 4 wherein the dissolved oxidic selenium compound is selenium dioxide.

6. A process as claimed in claim 4 wherein the dissolved oxidic selenium compound is selenium trioxide.

7. A process as claimed in claim 1 wherein the cadmium sulfide is precipitated by reacting an aqueous solution of cadmium salt with an aqueous solution of alkali metal sulfide, and wherein said aqueous solution containing dissolved oxidic selenium acid radicals is provided by dissolving said oxidic selenium compound in said aqueous solution of alkali metal sulfide.

8. A process as claimed in claim 7 wherein said dissolved oxidic selenium compound provides all of the selenium needed to combine with said precipitated cadmium sulfide to form a calcined cadmium red pigment of desired shade.

9. A process as claimed in claim 7 wherein the dissolved oxidic selenium compound is selenium dioxide.

10. A process as claimed in claim 7 wherein the dissolved oxidic selenium compound is selenium trioxide.

11. A process as claimed in claim 1 wherein said cadmium sulfide is precipitated by reacting an aqueous solution of cadmium salt with an aqueous solution of barium sulfide, and wherein said aqueous solution containing dissolved oxidic selenium acid radicals is provided by dissolving said oxidic selenium compound in said aqueous solution of cadmium salt.

12. A process as claimed in claim 11 wherein said dissolved oxidic selenium compound provides all of the selenium needed to combine with said precipitated cadmium sulfide to form a calcined cadmium red pigment of desired shade.

13. A process as claimed in claim 12 wherein the dissolved oxidic selenium compound is selenium dioxide.

14. A process as claimed in claim 12 wherein the dissolved oxidic selenium compound is selenium trioxide.

15. In a process for preparing pure cadmium red pigment of the type wherein cadmium sulfide is precipitated in an aqueous medium by reacting an aqueous solution of cadmium salt with an aqueous solution of alkali-metal sulfide, wherein selenium in insoluble form is coprecipitated with said cadmium sulfide, and wherein the resulting coprecipitate is subsequently calcined to convert it to pigment, the improvement which comprises coprecipitating at least a part of the total desired selenium from an aqueous solution containing water-soluble selenium acid radicals, said latter solution having been prepared by dissolving an oxidic selenium compound selected from the group consisting of selenium dioxide, selenium trioxide, and mixtures thereof, in at least one of said aqueous reactant solutions.

16. A process as claimed in claim 15 wherein the oxidic selenium compound which is dissolved is selenium dioxide.

17. A process as claimed in claim 15 wherein the oxidic selenium compound which is dissolved is selenium trioxide.

18. In a process for preparing extended cadmium red pigment, said process being of the type wherein cadmium sulfide is precipitated in an aqueous medium by reacting an aqueous solution of cadmium sulfate with an aqueous solution of barium sulfide, wherein selenium in insoluble form is coprecipitated with said cadmium sulfide, and wherein the resulting coprecipitate is calcined to convert it to pigment, the improvement which comprises dissolving oxidic selenium compound in said cadmium sulfate solution prior to reacting it with said barium sulfide solution, said oxidic selenium compound being selected from the group consisting of selenium dioxide, selenium trioxide, and mixtures thereof.

19. A process as claimed in claim 18 wherein said oxidic selenium compound provides all of the insoluble selenium which is needed to combine with said cadmium sulfide to produce a calcined extended cadmium red pigment of desired shade.

20. A process as claimed in claim 19 wherein said oxidic selenium compound is selenium dioxide.

References Cited in the file of this patent

UNITED STATES PATENTS

| | | |
|---|---|---|
| 2,134,055 | Meister | Oct. 25, 1938 |
| 2,360,280 | Rolph et al. | Oct. 10, 1944 |
| 2,643,196 | Allan et al. | June 23, 1953 |

OTHER REFERENCES

Ser. No. 350,065 Loefler (A. P. C.), published May 11, 1943.

Journal für praktische Chemie, vol. 95, pp. 1—30 (1865).